United States Patent
Kromwijk et al.

(10) Patent No.: US 10,915,536 B2
(45) Date of Patent: Feb. 9, 2021

(54) SYSTEMS AND METHODS FOR CONSTRAINT DRIVEN DATABASE SEARCHING

(71) Applicant: Palantir Technologies Inc., Palo Alto, CA (US)

(72) Inventors: Sander Kromwijk, New York, NY (US); Haithem Turki, New York, NY (US); Stephen Cohen, Palo Alto, CA (US); Yixun Xu, Long Island City, NY (US); Feridun Arda Kara, New York, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 215 days.

(21) Appl. No.: 16/160,099

(22) Filed: Oct. 15, 2018

(65) Prior Publication Data

US 2019/0050405 A1   Feb. 14, 2019

Related U.S. Application Data

(63) Continuation of application No. 15/484,983, filed on Apr. 11, 2017, now Pat. No. 10,133,783.

(51) Int. Cl.
*G06F 16/2455* (2019.01)
*G06F 16/248* (2019.01)
(Continued)

(52) U.S. Cl.
CPC ...... *G06F 16/24565* (2019.01); *G06F 16/245* (2019.01); *G06F 16/248* (2019.01); *G06F 16/24552* (2019.01); *G06F 16/256* (2019.01)

(58) Field of Classification Search
CPC ............. G06F 16/24565; G06F 16/245; G06F 16/24552; G06F 16/256; G06F 16/248
See application file for complete search history.

(56) References Cited

U.S. PATENT DOCUMENTS

| 5,515,488 A | 5/1996 | Hoppe et al. |
| 6,430,305 B1 | 8/2002 | Decker |

(Continued)

FOREIGN PATENT DOCUMENTS

| CN | 102546446 | 7/2012 |
| CN | 103167093 | 6/2013 |

(Continued)

OTHER PUBLICATIONS

"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.

(Continued)

*Primary Examiner* — Jay A Morrison
(74) *Attorney, Agent, or Firm* — Sheppard Mullin Richter & Hampton LLP

(57) ABSTRACT

Systems and methods are provided for performing constraint driven database searching. At least one constraint is received for a search of one or more databases comprising one or more datasets, each comprising multiple entry fields. The one or more databases comprising the one or more datasets may be accessed and searched based on the constraint to identify one or more dataset entries that contain the at least one constraint in one of multiple entry fields. A visual representation of the identified dataset entries may be provided to the user as results of the constraint driven database search. Additional constraints may be accepted to further narrow the results of constraint driven database search. The results may be exported and made accessible for later retrieval and/or cached for use in subsequent searches.

20 Claims, 6 Drawing Sheets

(51) Int. Cl.
  *G06F 16/245* (2019.01)
  *G06F 16/25* (2019.01)

(56) References Cited

U.S. PATENT DOCUMENTS

| | | | |
|---|---|---|---|
| 6,820,135 B1 | 11/2004 | Dingman | |
| 6,978,419 B1 | 12/2005 | Kantrowitz | |
| 6,980,984 B1 | 12/2005 | Huffman et al. | |
| 6,990,440 B1 * | 1/2006 | Sroka | G06F 16/20 704/4 |
| 7,168,039 B2 | 1/2007 | Bertram | |
| 7,461,077 B1 | 12/2008 | Greenwood | |
| 7,617,232 B2 | 11/2009 | Gabbert et al. | |
| 7,756,843 B1 | 7/2010 | Palmer | |
| 7,840,600 B1 * | 11/2010 | Bhatia | G06F 16/972 707/793 |
| 7,899,796 B1 | 3/2011 | Borthwick et al. | |
| 7,917,376 B2 | 3/2011 | Bellin et al. | |
| 7,941,321 B2 | 5/2011 | Greenstein et al. | |
| 8,036,971 B2 | 10/2011 | Aymeloglu et al. | |
| 8,037,046 B2 | 10/2011 | Udezue et al. | |
| 8,046,283 B2 | 10/2011 | Burns | |
| 8,054,756 B2 | 11/2011 | Chand et al. | |
| 8,214,490 B1 | 7/2012 | Vos et al. | |
| 8,229,902 B2 | 7/2012 | Vishniac et al. | |
| 8,290,838 B1 | 10/2012 | Thakur et al. | |
| 8,302,855 B2 | 11/2012 | Ma et al. | |
| 8,386,377 B1 | 2/2013 | Xiong et al. | |
| 8,473,454 B2 | 6/2013 | Evanitsky et al. | |
| 8,484,115 B2 | 7/2013 | Aymeloglu et al. | |
| 8,489,641 B1 | 7/2013 | Seefeld et al. | |
| 8,577,911 B1 | 11/2013 | Stepinski et al. | |
| 8,589,273 B2 | 11/2013 | Creeden et al. | |
| 8,688,573 B1 | 4/2014 | Ruknoic et al. | |
| 8,744,890 B1 | 6/2014 | Bernier | |
| 8,799,799 B1 | 8/2014 | Cervelli et al. | |
| 8,806,355 B2 | 8/2014 | Twiss et al. | |
| 8,812,960 B1 | 8/2014 | Sun et al. | |
| 8,924,388 B2 | 12/2014 | Elliot et al. | |
| 8,924,389 B2 | 12/2014 | Elliot et al. | |
| 8,938,686 B1 | 1/2015 | Erenrich et al. | |
| 8,949,164 B1 | 2/2015 | Mohler | |
| 9,069,842 B2 | 6/2015 | Melby | |
| 9,100,428 B1 | 8/2015 | Visbal | |
| 9,111,281 B2 | 8/2015 | Stibel et al. | |
| 9,129,219 B1 | 9/2015 | Robertson et al. | |
| 9,256,664 B2 | 2/2016 | Chakerian et al. | |
| 9,280,618 B1 | 3/2016 | Bruce et al. | |
| 9,286,373 B2 | 3/2016 | Elliot et al. | |
| 9,335,911 B1 | 5/2016 | Elliot et al. | |
| 10,133,783 B2 | 11/2018 | Kromwijk et al. | |
| 2002/0065708 A1 | 5/2002 | Senay et al. | |
| 2002/0095360 A1 | 7/2002 | Joao | |
| 2002/0095658 A1 | 7/2002 | Shulman | |
| 2002/0103705 A1 | 8/2002 | Brady | |
| 2002/0147805 A1 | 10/2002 | Leshem et al. | |
| 2003/0126102 A1 | 7/2003 | Borthwick | |
| 2004/0034570 A1 | 2/2004 | Davis | |
| 2004/0111480 A1 | 6/2004 | Yue | |
| 2004/0153418 A1 | 8/2004 | Hanweck | |
| 2004/0236688 A1 | 11/2004 | Bozeman | |
| 2005/0010472 A1 | 1/2005 | Quatse et al. | |
| 2005/0086207 A1 | 4/2005 | Heuer et al. | |
| 2005/0154628 A1 | 7/2005 | Eckart et al. | |
| 2005/0154769 A1 | 7/2005 | Eckart et al. | |
| 2006/0026120 A1 | 2/2006 | Carolan et al. | |
| 2006/0026170 A1 | 2/2006 | Kreitler et al. | |
| 2006/0080283 A1 | 4/2006 | Shipman | |
| 2006/0143034 A1 | 6/2006 | Rothermel | |
| 2006/0143075 A1 | 6/2006 | Carr et al. | |
| 2006/0143079 A1 | 6/2006 | Basak et al. | |
| 2006/0282429 A1 | 12/2006 | Hernandez-Sherrington et al. | |
| 2007/0000999 A1 | 1/2007 | Kubo et al. | |
| 2007/0011304 A1 | 1/2007 | Error | |
| 2007/0038646 A1 | 2/2007 | Thota | |
| 2007/0150801 A1 | 6/2007 | Chidlovskii et al. | |
| 2007/0156673 A1 | 7/2007 | Maga | |
| 2007/0162454 A1 | 7/2007 | D'Albora et al. | |
| 2007/0185867 A1 | 8/2007 | Maga | |
| 2007/0192122 A1 | 8/2007 | Routson et al. | |
| 2007/0284433 A1 | 12/2007 | Domenica et al. | |
| 2008/0065655 A1 | 3/2008 | Chakravarthy et al. | |
| 2008/0069081 A1 | 3/2008 | Chand et al. | |
| 2008/0077642 A1 | 3/2008 | Carbone et al. | |
| 2008/0103996 A1 | 5/2008 | Forman et al. | |
| 2008/0208735 A1 | 8/2008 | Balet et al. | |
| 2008/0222295 A1 | 9/2008 | Robinson et al. | |
| 2008/0243711 A1 | 10/2008 | Aymeloglu et al. | |
| 2008/0255973 A1 | 10/2008 | El Wade et al. | |
| 2008/0270328 A1 | 10/2008 | Lafferty et al. | |
| 2008/0294663 A1 | 11/2008 | Heinley et al. | |
| 2008/0313132 A1 | 12/2008 | Hao et al. | |
| 2009/0076845 A1 | 3/2009 | Bellin et al. | |
| 2009/0094166 A1 | 4/2009 | Aymeloglu et al. | |
| 2009/0094270 A1 | 4/2009 | Alirez et al. | |
| 2009/0106178 A1 | 4/2009 | Chu | |
| 2009/0112745 A1 | 4/2009 | Stefanescu | |
| 2009/0125359 A1 | 5/2009 | Knapic | |
| 2009/0125459 A1 | 5/2009 | Norton et al. | |
| 2009/0132953 A1 | 5/2009 | Reed et al. | |
| 2009/0157732 A1 | 6/2009 | Hao et al. | |
| 2009/0187546 A1 | 7/2009 | Whyte et al. | |
| 2009/0187548 A1 | 7/2009 | Ji et al. | |
| 2009/0249244 A1 | 10/2009 | Robinson et al. | |
| 2009/0254842 A1 | 10/2009 | Leacock et al. | |
| 2009/0259636 A1 | 10/2009 | Labrou et al. | |
| 2009/0271343 A1 | 10/2009 | Vaiciulis et al. | |
| 2009/0307049 A1 | 12/2009 | Elliott et al. | |
| 2009/0313463 A1 | 12/2009 | Pang et al. | |
| 2009/0319418 A1 | 12/2009 | Herz | |
| 2009/0319515 A1 | 12/2009 | Minton et al. | |
| 2009/0319891 A1 | 12/2009 | MacKinlay | |
| 2010/0030722 A1 | 2/2010 | Goodson et al. | |
| 2010/0031141 A1 | 2/2010 | Summers et al. | |
| 2010/0042922 A1 | 2/2010 | Bradateanu et al. | |
| 2010/0057622 A1 | 3/2010 | Faith et al. | |
| 2010/0070842 A1 | 3/2010 | Aymeloglu et al. | |
| 2010/0082532 A1 | 4/2010 | Shaik et al. | |
| 2010/0098318 A1 | 4/2010 | Anderson | |
| 2010/0106752 A1 | 4/2010 | Eckardt et al. | |
| 2010/0114887 A1 | 5/2010 | Conway et al. | |
| 2010/0131502 A1 | 5/2010 | Fordham | |
| 2010/0161735 A1 | 6/2010 | Sharma | |
| 2010/0191563 A1 | 7/2010 | Schlaifer et al. | |
| 2010/0211535 A1 | 8/2010 | Rosenberger | |
| 2010/0235915 A1 | 9/2010 | Memon et al. | |
| 2010/0262688 A1 | 10/2010 | Hussain et al. | |
| 2010/0293174 A1 | 11/2010 | Bennett et al. | |
| 2010/0312837 A1 | 12/2010 | Bodapati et al. | |
| 2011/0040776 A1 | 2/2011 | Najm et al. | |
| 2011/0061013 A1 | 3/2011 | Bilicki et al. | |
| 2011/0078173 A1 | 3/2011 | Seligmann et al. | |
| 2011/0093327 A1 | 4/2011 | Fordyce, III et al. | |
| 2011/0099133 A1 | 4/2011 | Chang et al. | |
| 2011/0137875 A1 | 6/2011 | Ziauddin et al. | |
| 2011/0153384 A1 | 6/2011 | Horne et al. | |
| 2011/0173093 A1 | 7/2011 | Psota et al. | |
| 2011/0208565 A1 | 8/2011 | Ross et al. | |
| 2011/0208724 A1 | 8/2011 | Jones et al. | |
| 2011/0213655 A1 | 9/2011 | Henkin | |
| 2011/0218955 A1 | 9/2011 | Tang | |
| 2011/0270604 A1 | 11/2011 | Qi et al. | |
| 2011/0270834 A1 | 11/2011 | Sokolan et al. | |
| 2011/0289397 A1 | 11/2011 | Eastmond et al. | |
| 2011/0295649 A1 | 12/2011 | Fine | |
| 2011/0295795 A1 | 12/2011 | Venkatasubramanian et al. | |
| 2011/0314007 A1 | 12/2011 | Dassa et al. | |
| 2011/0314024 A1 | 12/2011 | Chang et al. | |
| 2012/0004904 A1 | 1/2012 | Shin et al. | |
| 2012/0011238 A1 | 1/2012 | Rathod | |
| 2012/0011245 A1 | 1/2012 | Gillette et al. | |
| 2012/0022945 A1 | 1/2012 | Falkenborg et al. | |
| 2012/0054284 A1 | 3/2012 | Rakshit | |
| 2012/0059853 A1 | 3/2012 | Jagota | |

(56) References Cited

U.S. PATENT DOCUMENTS

| | | |
|---|---|---|
| 2012/0066166 A1 | 3/2012 | Curbera et al. |
| 2012/0079363 A1 | 3/2012 | Folting et al. |
| 2012/0084117 A1 | 4/2012 | Tavares et al. |
| 2012/0084287 A1 | 4/2012 | Lakshminarayan et al. |
| 2012/0089606 A1 | 4/2012 | Eshwar et al. |
| 2012/0131512 A1 | 5/2012 | Takeuchi et al. |
| 2012/0144335 A1 | 6/2012 | Abeln et al. |
| 2012/0158527 A1 | 6/2012 | Cannelongo et al. |
| 2012/0159362 A1 | 6/2012 | Brown et al. |
| 2012/0173381 A1 | 7/2012 | Smith |
| 2012/0215784 A1 | 8/2012 | King et al. |
| 2012/0221553 A1 | 8/2012 | Wittmer et al. |
| 2012/0226523 A1 | 9/2012 | Weiss |
| 2012/0245976 A1 | 9/2012 | Kumar et al. |
| 2012/0290527 A1 | 11/2012 | Yalamanchilli |
| 2012/0323888 A1 | 12/2012 | Osann, Jr. |
| 2013/0016106 A1 | 1/2013 | Yip et al. |
| 2013/0054306 A1 | 2/2013 | Bhalla |
| 2013/0055145 A1 | 2/2013 | Antony et al. |
| 2013/0057551 A1 | 3/2013 | Ebert et al. |
| 2013/0096988 A1 | 4/2013 | Grossman et al. |
| 2013/0110746 A1 | 5/2013 | Ahn |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0185245 A1 | 7/2013 | Anderson |
| 2013/0185307 A1 | 7/2013 | El-Yaniv et al. |
| 2013/0218879 A1 | 8/2013 | Park et al. |
| 2013/0226318 A1 | 8/2013 | Procyk |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0263019 A1 | 10/2013 | Castellanos et al. |
| 2013/0268520 A1 | 10/2013 | Fisher et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0318604 A1 | 11/2013 | Coates et al. |
| 2014/0012796 A1 | 1/2014 | Petersen et al. |
| 2014/0040371 A1 | 2/2014 | Gurevich et al. |
| 2014/0053091 A1 | 2/2014 | Hou et al. |
| 2014/0058914 A1 | 2/2014 | Song et al. |
| 2014/0068487 A1 | 3/2014 | Steiger et al. |
| 2014/0095509 A1 | 4/2014 | Patton |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0189870 A1 | 7/2014 | Singla et al. |
| 2014/0195515 A1 | 7/2014 | Baker et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0280056 A1 | 9/2014 | Kelly |
| 2014/0282160 A1 | 9/2014 | Zarpas |
| 2014/0344230 A1 | 11/2014 | Krause et al. |
| 2014/0358829 A1 | 12/2014 | Hurwitz |
| 2014/0366132 A1 | 12/2014 | Stiansen et al. |
| 2015/0073929 A1 | 3/2015 | Psota et al. |
| 2015/0073954 A1 | 3/2015 | Braff |
| 2015/0095773 A1 | 4/2015 | Gonsalves et al. |
| 2015/0100897 A1 | 4/2015 | Sun et al. |
| 2015/0106170 A1 | 4/2015 | Bonica |
| 2015/0106379 A1 | 4/2015 | Elliot et al. |
| 2015/0134599 A1 | 5/2015 | Banerjee et al. |
| 2015/0135256 A1 | 5/2015 | Hoy et al. |
| 2015/0188872 A1 | 7/2015 | White |
| 2015/0242401 A1 | 8/2015 | Liu |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0180557 A1 | 6/2016 | Yousaf et al. |
| 2017/0068712 A1 | 3/2017 | Streufert et al. |
| 2018/0293239 A1 | 10/2018 | Kromwijk et al. |

FOREIGN PATENT DOCUMENTS

| | | |
|---|---|---|
| CN | 102054015 | 5/2014 |
| DE | 102014204827 | 9/2014 |
| DE | 102014204830 | 9/2014 |
| DE | 102014204834 | 9/2014 |
| EP | 2487610 | 8/2012 |
| EP | 2858018 | 4/2015 |
| EP | 2869211 | 5/2015 |
| EP | 2889814 | 7/2015 |
| EP | 2892197 | 7/2015 |
| EP | 2963595 | 1/2016 |
| EP | 2996053 | 3/2016 |
| EP | 3035214 | 6/2016 |
| EP | 3038002 | 6/2016 |
| EP | 3040885 | 7/2016 |
| EP | 3388960 | 10/2018 |
| WO | WO 2005/116851 | 12/2005 |
| WO | WO 2012/061162 | 5/2012 |

OTHER PUBLICATIONS

"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.

"SAP BusinessObjects Explorer Online Help," Mar. 19, 2012, retrieved on Apr. 21, 2016 http://help.sap.com/businessobject/product_guides/boexir4/en/xi4_exp_user_en.pdf.

Amnet, "5 Great Tools for Visualizing Your Twitter Followers," posted Aug. 4, 2010, http://www.amnetblog.com/component/content/article/115-5-grate-tools-for-visualizing-your-twitter-followers.html.

Appacts, "Smart Thinking for Super Apps," <http://www.appacts.com> Printed Jul. 18, 2013 in 4 pages.

Apsalar, "Data Powered Mobile Advertising," "Free Mobile App Analytics" and various analytics related screen shots <http://apsalar.com> Printed Jul. 18, 2013 in 8 pages.

Capptain—Pilot Your Apps, <http://www.capptain.com> Printed Jul. 18, 2013 in 6 pages.

Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.

Chaudhuri et al., "An Overview of Business Intelligence Technology," Communications of the ACM, Aug. 2011, vol. 54, No. 8.

Cohn, et al., "Semi-supervised clustering with user feedback," Constrained Clustering: Advances in Algorithms, Theory, and Applications 4.1 (2003): 17-32.

Countly Mobile Analytics, <http://count.ly/> Printed Jul. 18, 2013 in 9 pages.

Distimo—App Analytics, <http://www.distimo.com/app-analytics> Printed Jul. 18, 2013 in 5 pages.

Flurry Analytics, <http://www.flurry.com/> Printed Jul. 18, 2013 in 14 pages.

Gill et al., "Computerised Linking of Medical Records: Methodological Guidelines,".

Google Analytics Official Website—Web Analytics & Reporting, <http://www.google.com/analytics.index.html> Printed Jul. 18, 2013 in 22 pages.

Gorr et al., "Crime Hot Spot Forecasting: Modeling and Comparative Evaluation", Grant 98-IJ-CX-K005, May 6, 2002, 37 pages.

Gu et al., "Record Linkage: Current Practice and Future Directions," Jan. 15, 2004, pp. 32.

Hansen et al., "Analyzing Social Media Networks with NodeXL: Insights from a Connected World", Chapter 4, pp. 53-67 and Chapter 10, pp. 143-164, published Sep. 2010.

(56) References Cited

OTHER PUBLICATIONS

Hua et al., "A Multi-attribute Data Structure with Parallel Bloom Filters for Network Services", HiPC 2006, LNCS 4297, pp. 277-288, 2006.
Janssen, Jan-Keno, "Wo bist'n du?—Googles Geodienst Latitude," Jan. 17, 2011, pp. 86-88, retrieved from the internet on Jul. 30, 2015 http://www.heise.de/artikel-archiv/ct/2011/03/086/@00250@/ct.11.03.086-088.pdf.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kontagent Mobile Analytics, <http://www.kontagent.com/> Printed Jul. 18, 2013 in 9 pages.
Localytics—Mobile App Marketing & Analytics, <http://www.localytics.com/> Printed Jul. 18, 2013 in 12 pages.
Manno et al., "Introducing Collaboration in Single-user Applications through the Centralized Control Architecture," 2010, pp. 10.
Mixpanel—Mobile Analytics, <https://mixpanel.com/> Printed Jul. 18, 2013 in 13 pages.
Notice of Allowance for U.S. Appl. No. 14/225,084 dated May 4, 2015.
Notice of Allowance for U.S. Appl. No. 14/319,161 dated May 4, 2015.
Notice of Allowance for U.S. Appl. No. 14/323,935 dated Oct. 1, 2015.
Notice of Allowance for U.S. Appl. No. 14/479,863 dated Mar. 31, 2015.
Notice of Allowance for U.S. Appl. No. 14/483,527, dated Apr. 29, 2016.
Notice of Allowance for U.S. Appl. No. 14/552,336 dated Nov. 3, 2015.
Notice of Allowance for U.S. Appl. No. 14/746,671 dated Jan. 21, 2016.
Notice of Allowance for U.S. Appl. No. 14/858,647 dated Mar. 4, 2016.
Official Communication for European Patent Application No. 14187996.5 dated Feb. 19, 2016.
Official Communication for European Patent Application No. 14187996.5 dated Feb. 12, 2015.
Official Communication for European Patent Application No. 14191540.5 dated May 27, 2015.
Official Communication for European Patent Application No. 14200246.8 dated May 29, 2015.
Official Communication for European Patent Application No. 14200298.9 dated May 13, 2015.
Official Communication for European Patent Application No. 15181419.1 dated Sep. 29, 2015.
Official Communication for European Patent Application No. 15184764.7 dated Dec. 14, 2015.
Official Communication for European Patent Application No. 15200073.3 dated Mar. 30, 2016.
Official Communication for European Patent Application No. 15201924.6 dated Apr. 25, 2016.
Official Communication for European Patent Application No. 16152984.7 dated Mar. 24, 2016.
Official Communication for Great Britain Patent Application No. 1404499.4 dated Aug. 20, 2014.
Official Communication for Great Britain Patent Application No. 1404499.4 dated Jun. 11, 2015.
Official Communication for Great Britain Patent Application No. 1404489.5 dated Aug. 27, 2014.
Official Communication for Great Britain Patent Application No. 1404486.1 dated May 21, 2015.
Official Communication for Great Britain Patent Application No. 1404499.4 dated Sep. 29, 2014.
Official Communication for Great Britain Patent Application No. 1404486.1 dated Aug. 27, 2014.
Official Communication for Great Britain Patent Application No. 1404489.5 dated Oct. 6, 2014.
Official Communication for Great Britain Patent Application No. 1404489.5 dated May 21, 2015.
Official Communication for Netherlands Patent Application No. 2012417 dated Sep. 18, 2015.
Official Communication for Netherlands Patent Application No. 2012421 dated Sep. 18, 2015.
Official Communication for Netherlands Patent Application No. 2012438 dated Sep. 21, 2015.
Official Communication for New Zealand Patent Application No. 622473 dated Mar. 27, 2014.
Official Communication for New Zealand Patent Application No. 622513 dated Apr. 3, 2014.
Official Communication for New Zealand Patent Application No. 622473 dated Jun. 19, 2014.
Official Communication for New Zealand Patent Application No. 628161 dated Aug. 25, 2014.
Official Communication for U.S. Appl. No. 13/827,491 dated Dec. 1, 2014.
Official Communication for U.S. Appl. No. 13/827,491 dated Oct. 9, 2015.
Official Communication for U.S. Appl. No. 13/827,491 dated Jun. 22, 2015.
Official Communication for U.S. Appl. No. 14/141,252 dated Oct. 8, 2015.
Official Communication for U.S. Appl. No. 14/141,252 dated Apr. 14, 2016.
Official Communication for U.S. Appl. No. 14/225,006 dated Dec. 21, 2015.
Official Communication for U.S. Appl. No. 14/225,006 dated Feb. 27, 2015.
Official Communication for U.S. Appl. No. 14/225,006 dated Sep. 2, 2015.
Official Communication for U.S. Appl. No. 14/225,006 dated Sep. 10, 2014.
Official Communication for U.S. Appl. No. 14/225,084 dated Feb. 26, 2016.
Official Communication for U.S. Appl. No. 14/225,084 dated Feb. 20, 2015.
Official Communication for U.S. Appl. No. 14/225,084 dated Sep. 2, 2014.
Official Communication for U.S. Appl. No. 14/225,084 dated Sep. 11, 2015.
Official Communication for U.S. Appl. No. 14/225,084 dated Jan. 4, 2016.
Official Communication for U.S. Appl. No. 14/225,160 dated Jan. 25, 2016.
Official Communication for U.S. Appl. No. 14/225,160 dated Aug. 12, 2015.
Official Communication for U.S. Appl. No. 14/225,160 dated Jul. 29, 2014.
Official Communication for U.S. Appl. No. 14/225,160 dated May 20, 2015.
Official Communication for U.S. Appl. No. 14/225,160 dated Feb. 11, 2015.
Official Communication for U.S. Appl. No. 14/225,160 dated Oct. 22, 2014.
Official Communication for U.S. Appl. No. 14/225,160 dated Apr. 22, 2016.
Official Communication for U.S. Appl. No. 14/225,160 dated Jun. 16, 2016.
Official Communication for U.S. Appl. No. 14/306,138 dated Dec. 24, 2015.
Official Communication for U.S. Appl. No. 14/306,138 dated Dec. 3, 2015.

(56) References Cited

OTHER PUBLICATIONS

Official Communication for U.S. Appl. No. 14/306,147 dated Dec. 24, 2015.
Official Communication for U.S. Appl. No. 14/319,161 dated Jan. 23, 2015.
Official Communication for U.S. Appl. No. 14/319,765 dated Feb. 1, 2016.
Official Communication for U.S. Appl. No. 14/451,221 dated Oct. 21, 2014.
Official Communication for U.S. Appl. No. 14/463,615 dated Sep. 10, 2015.
Official Communication for U.S. Appl. No. 14/463,615 dated Dec. 9, 2015.
Official Communication for U.S. Appl. No. 14/463,615 dated May 21, 2015.
Official Communication for U.S. Appl. No. 14/463,615 dated Nov. 13, 2014.
Official Communication for U.S. Appl. No. 14/463,615 dated Jan. 28, 2015.
Official Communication for U.S. Appl. No. 14/479,863 dated Dec. 26, 2014.
Official Communication for U.S. Appl. No. 14/483,527 dated Jun. 22, 2015.
Official Communication for U.S. Appl. No. 14/483,527 dated Jan. 28, 2015.
Official Communication for U.S. Appl. No. 14/483,527 dated Oct. 28, 2015.
Official Communication for U.S. Appl. No. 14/552,336 dated Jul. 20, 2015.
Official Communication for U.S. Appl. No. 14/562,524 dated Sep. 14, 2015.
Official Communication for U.S. Appl. No. 14/562,524 dated Nov. 10, 2015.
Official Communication for U.S. Appl. No. 14/571,098 dated Feb. 23, 2016.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/631,633 dated Sep. 10, 2015.
Official Communication for U.S. Appl. No. 14/676,621 dated Oct. 29, 2015.
Official Communication for U.S. Appl. No. 14/676,621 dated Jul. 30, 2015.
Official Communication for U.S. Appl. No. 14/746,671 dated Nov. 12, 2015.
Official Communication for U.S. Appl. No. 14/800,447 dated Dec. 10, 2015.
Official Communication for U.S. Appl. No. 14/813,749 dated Sep. 28, 2015.
Official Communication for U.S. Appl. No. 14/813,749 dated Apr. 8, 2016.
Official Communication for U.S. Appl. No. 14/842,734 dated Nov. 19, 2015.
Official Communication for U.S. Appl. No. 14/929,584 dated Feb. 4, 2016.
Official Communication for U.S. Appl. No. 14/929,584 dated May 25, 2016.
Open Web Analytics (OWA), <http://www.openwebanalytics.com/> Printed Jul. 19, 2013 in 5 pages.
Piwik—Free Web Analytics Software. <http://piwik.org/> Printed Jul. 19, 2013 in18 pages.
Psaltis, Andrew G., "Streaming Data—Designing the Real-Time Pipeline," Jan. 16, 2015, vol. MEAP VO3, pp. 0-12.
Sigrist, et al., "PROSITE, a Protein Domain Database for Functional Characterization and Annotation," Nucleic Acids Research, 2010, vol. 38, pp. D161-D166.
StatCounter—Free Invisible Web Tracker, Hit Counter and Web Stats, <http://statcounter.com/> Printed Jul. 19, 2013 in 17 pages.
TestFlight—Beta Testing on the Fly, <http://testflightapp.com/> Printed Jul. 18, 2013 in 3 pages.
Trak.io, <http://trak.io/> printed Jul. 18, 2013 in 3 pages.
UserMetrix, <http://usermetrix.com/android-analytics> printed Jul. 18, 2013 in 3 pages.
Valentini et al., "Ensembles of Learning Machines", M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353. [Uploaded in 5 Parts].
Wang et al., "Research on a Clustering Data De-Duplication Mechanism Based on Bloom Filter," IEEE 2010, 5 pages.
Wikipedia, "Multimap," Jan. 1, 2013, https://en.wikipedia.org/w/index.php?title=Multimap&oldid=530800748.
Wikipedia, "Mobile Web," Jan. 23, 2015, retrieved from the internet on Mar. 15, 2016 https://en.wikipedia.org/w/index.php?title=Mobile_Web&oldid=643800164.
Windley, Phillip J., "The Live Web: Building Event-Based Connections in the Cloud," Dec. 21, 2011, pp. 10, 216.
Winkler, William E., "Bureau of the Census Statistical Research Division Record Linkage Software and Methods for Merging Administrative Lists," Statistical Research Report Series No. RR2001/03, Jul. 23, 2001, https://www.census.gov/srd/papers/pdf/rr2001-03.pdf, retrieved on Mar. 9, 2016.
Official Communication for U.S. Appl. No. 15/484,983 dated Nov. 6, 2017.
MacDonald et al., "Pro ASP.NET in C# 2010," Fourth Edition, ISBN-13:978-1-4302-2529-4, Chapter 8, 2010.
Steve Jones Ed—Association for Computing Machinery: "Graphical Query Specification and Dynamic Result Previews for a Digital Library", UIST '98. 11th Annual Symposium on User Interface Software and Technology. Proceedings of the ACM Symposium on User Interface Software and Technology. San Francisco, Ca Nov. 1-4, 1998, pp. 143-151.
Official Communication for European Patent Application No. 18166684.3 dated May 25, 2018.

\* cited by examiner

FIG. 3A

| | First Name | Last Name | Email Address | User ID |
|---|---|---|---|---|
| 1 | John | Doe | johndoe@abc.com | 1234 |
| 2 | John | Smith | johnsmith@abc.com | 2345 |
| 3 | | | | |
| 4 | | | | |
| 5 | | | | |
| 6 | | | | |
| 7 | | | | |
| 8 | | | | |
| 9 | | | | |
| 10 | | | | |
| 11 | | | | |
| 12 | | | | |
| 13 | | | | |
| 14 | | | | |

FIG. 3B

| | First Name | Last Name | Location | User ID |
|---|---|---|---|---|
| 1 | John | Doe | New York, NY | 1234 |
| 2 | John | Smith | Los Angeles, CA | 2345 |
| 3 | Jane | Doe | London, UK | 3456 |
| 4 | | | | |
| 5 | | | | |
| 6 | | | | |
| 7 | | | | |
| 8 | | | | |
| 9 | | | | |
| 10 | | | | |
| 11 | | | | |
| 12 | | | | |
| 13 | | | | |
| 14 | | | | |

(47) (4) (84)

SYSTEMS AND METHODS FOR CONSTRAINT DRIVEN DATABASE SEARCHING

CROSS REFERENCE TO RELATED APPLICATIONS

This application is a continuation of U.S. patent application Ser. No. 15/484,983, filed Apr. 11, 2017, the content of which is hereby incorporated by reference in its entirety.

TECHNICAL FIELD

This disclosure relates to approaches for searching and creating datasets from one or more databases.

BACKGROUND

Under conventional approaches, database searching may be performed based on keyword queries. Keyword search queries performed across large and/or multiple databases may suffer from being time intensive. More targeted search queries limited to certain fields within a database may miss important results. Additionally, results from such searches may be confusing, difficult to interpret, and/or off-target. These and other drawbacks exist with conventional solutions.

SUMMARY

Various embodiments of the present disclosure include systems, methods, and nontransitory computer readable media configured to perform constraint driven database searching. At least one constraint is received for a search of one or more databases comprising one or more datasets, each comprising multiple entry fields. The one or more databases comprising the one or more datasets may be accessed and searched based on the constraint to identify one or more dataset entries that contain the at least one constraint in one of multiple entry fields. A visual representation of the identified dataset entries may be provided to the user as results of the constraint driven database search.

In some embodiments, the systems, methods, and non-transitory computer readable media are configured to receive one or more additional constraints that further refine the search based on the one or more additional constraints.

In some embodiments, the systems, methods, and non-transitory computer readable media are configured to receive one or more additional constraints that modify the visual representation of previously identified dataset entries and cause additional dataset entries to be identified.

In some embodiments, the systems, methods, and non-transitory computer readable media are configured to compare the field type for the dataset field of the one or more identified dataset entries in which the constraint was identified in order to determine the appropriate arrangement of the visual representation of the identified dataset entries.

In some embodiments, the systems, methods, and non-transitory computer readable media are configured to assign values to the types of entry fields in which the constraints were found in order to determine the entry field most suitable for the constraint in the visual representation of the identified dataset entries.

In some embodiments, the systems, methods, and non-transitory computer readable media are configured to update the visual representation of the identified dataset entries based on additional constraints provided by a user.

In some embodiments, the systems, methods, and non-transitory computer readable media are configured to determine whether the constraint has already been searched based on a cached dataset associated with the constraint and utilize the cached dataset to identify one or more dataset entries that contain the constraint.

In some embodiments, the systems, methods, and non-transitory computer readable media are configured to import one or more databases and/or one or more datasets identified by a user into a search and/or incorporate the identified one or more databases and/or one or more datasets into a visual representation of the results of a constraint search.

In some embodiments, the systems, methods, and non-transitory computer readable media are configured to generate a new dataset comprising the results of the constraint driven database search and export for later retrieval and/or access These and other features of the systems, methods, and non-transitory computer readable media are disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention(s).

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention(s) are utilized, and the accompanying drawings of which:

FIGS. 3A-B depicts exemplary interfaces presented to a user for conducting constraint driven database searching and viewing the results thereof, in accordance with various embodiments.

DETAILED DESCRIPTION

Under conventional approaches, database searching may be performed based on keyword queries. Keyword search queries performed across large and/or multiple databases may suffer from being time intensive. More targeted search queries limited to certain fields within a database may miss important results. Additionally, results from such searches may be confusing, difficult to interpret, and/or off-target. These and other drawbacks exist with conventional solutions.

A claimed solution rooted in computer technology overcomes problems specifically arising in the realm of computer technology. In various implementations, a computing system is configured to provide tools that facilitate constraint driven database searching. In an implementation, a user may provide the system with a constraint. The system may access multiple databases to identify databases with data entries corresponding to the constraint. The system may accept additional constraints to narrow the identified databases and entries. The system may provide access to the identified databases for further analysis.

It will be appreciated by those having skill in the art that the implementations described herein may be practiced without these specific details or with an equivalent arrangement. In other instances, well-known structures and devices are shown in block diagram form to avoid unnecessarily obscuring the implementations.

Figure 1:
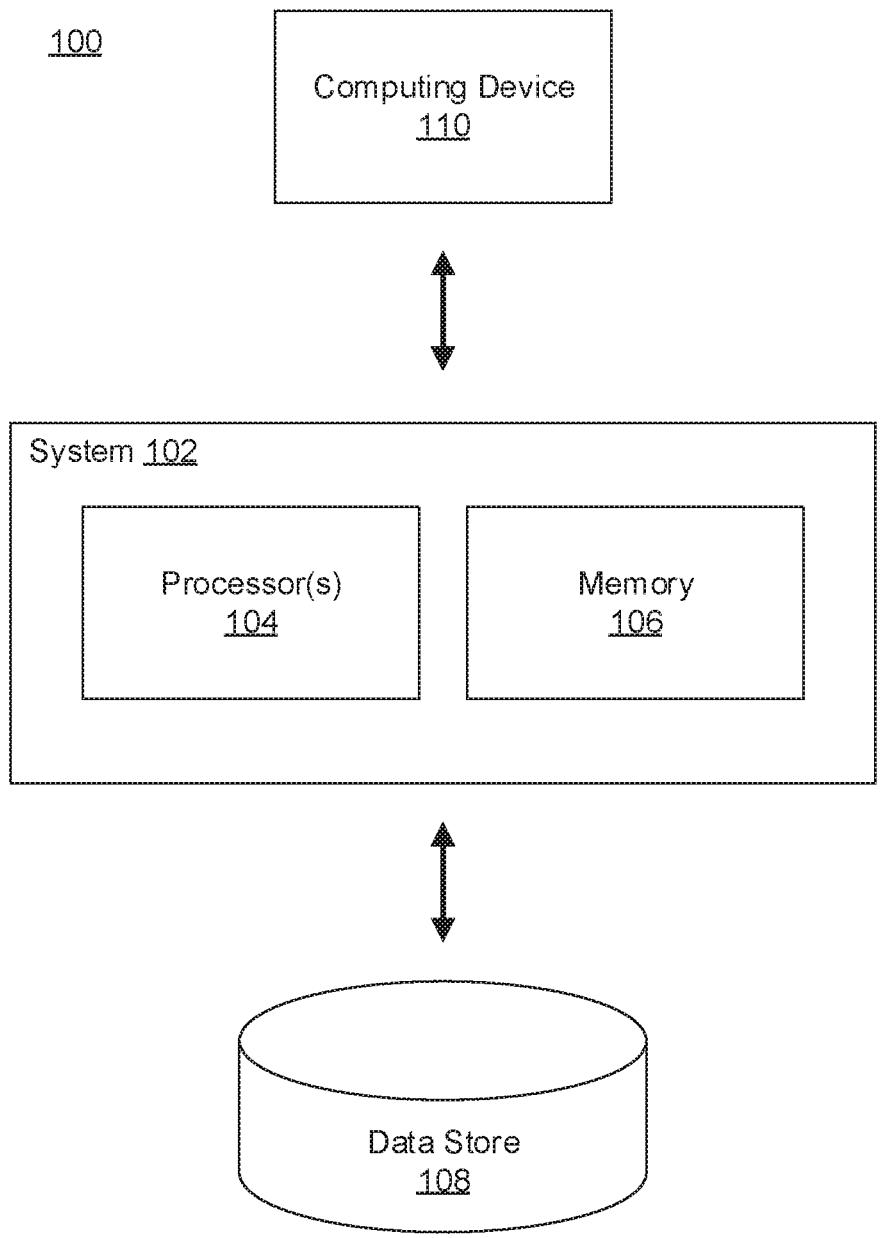
FIG. 1 depicts a diagram of an example of a system for performing constraint driven database searching, in accordance with various embodiments.

FIG. 1 depicts a diagram of an example environment 100 for performing constraint driven database searching, in accordance with various embodiments. As shown in FIG. 1, the example environment 100 can include at least one computing system 102 that includes one or more processors 104 and memory 106. The memory 106 may be non-transitory and computer-readable. The memory 106 may store instructions that, when executed by the one or more processors 104, cause the one or more processors 104 to perform various operations described herein. The environment 100 may also include a computing device 110 that is able to communicate with the system 102 (e.g., over one or more computer networks) and a data store 108 that is accessible to the system 102. For example, the data store 108 may include one or more searchable databases, each containing one or more searchable datasets containing multiple entry fields.

In some embodiments, the system 102 and the computing device 110 may be integrated in a single device or system. Alternatively, the system 102 and the computing device 110 may be individual computing devices. For example, the computing device 110 may be a mobile device and the system 102 may be a computing server. The data store 108 may be accessible to the system 102, for example, through the memory 106, another device coupled to the system 102, cloud-based storage, etc. Various operations that are capable of being performed by the system 102 are described below in reference to FIGS. 2-4.

Figure 2:
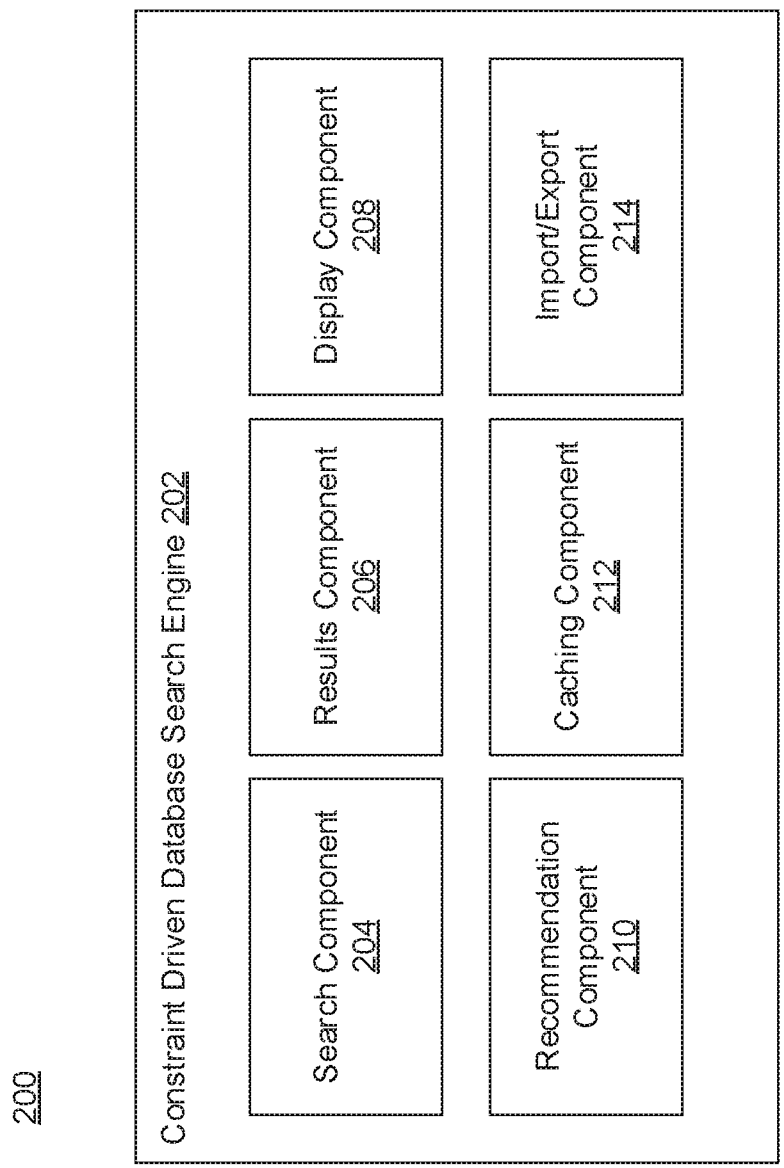
FIG. 2 depicts a diagram of an example of a constraint driven database search engine, in accordance with various embodiments.

FIG. 2 depicts a diagram 200 of an example of a constraint driven database search engine 202, in accordance with various embodiments. In various embodiments, functionality of the constraint driven database search engine 202 may be performed by one or more servers, workstations, desktop computers, laptop computers, mobile devices, and/or other computing devices. In some embodiments, functionality of the constraint driven database search engine 202 may be performed by computing system 102. For example, the components of constraint driven database search engine 202 may comprise computer-readable instructions executable by processors 104. The components of constraint driven database search engine 202 may comprise search component 204, results component 206, display component 208, recommendation component 210, caching component 212, import/export component 214, and/or other computer program components. As used herein, for convenience, the various components of constraint driven database search engine 202 will be described as performing an operation, when, in fact, the various components comprise instructions which may program the processors 104 (and therefore computing system 102) to perform the operation.

Search component 204 may be configured to search one or more databases comprising one or more datasets based on constraints. For example, the constraints may be provided by a user. The one or more constraints may be received by computing device 110 as input from a user. The one or more constraints may comprise a text string of one or more letters, numbers, words, and/or other textual input. In some implementations, the one or more constraints may be automatically identified (i.e., without input from the user). In various implementations, search component 204 may be configured to search across one or more databases to identify all dataset entries that contain a constraint in at least one entry field of the multiple entry fields for each dataset entry. In some implementations, search component 204 may be configured to further search, from the identified dataset entries containing a first set of one or more constraints, for one or more dataset entries that contain one or more additional constraints.

For example, and referring to FIG. 3A, exemplary interface 300 is depicted. One or more constraints may be received via exemplary interface 300. In various implementations, one or more cells of a table of exemplary interface 300 may be configured to receive one or more constraints. For example, constraint 302 comprising "John" may be received via one or more cells of a table of exemplary interface 300. Search component 204 may be configured to search one or more databases and/or one or more datasets of one or more databases and identify all dataset entries that contain constraint 302. For example, search component 204 may identify at least a first dataset entry from one or more databases for "John Doe" who has an email address "johndoe@abc.com" and who has a user ID of "1234." Constraint 304 comprising "Smith" may also be received via one or more cells of a table of exemplary interface 300. Search component 204 may be configured to search one or more databases and/or one or more datasets of one or more databases and identify dataset entries that contain constraint 304. For example, search component 204 may identify at least a second dataset entry from one or more database for "John Smith" who has an email address "johnsmith@abc.com" and who has a user ID of "2345."

In various implementations, search component 204 may be configured to refine a search for a constraint based on one or more other constraints searched. For example, search component 204 may be configured to refine a previous search in response to a subsequent search conducted based on one or more other constraints. For example, and referring to FIG. 3A, if the cell that received constraint 304 was in the same row as the cell that received constraint 302, the search for constraint 302 may be further limited by constraint 304, and identified dataset entries would need to contain constraint 302 in one dataset entry field and constraint 304 in another dataset entry field. As such, search component 204 may further search all the identified dataset entries containing constraint 302 and identify all the dataset entries that contained constraint 302 that also contain constraint 304.

In various implementations, search component 204 may be configured to build on previous searches by searching one or more databases and/or one or more datasets of one or more databases and identify dataset entries that contain additional constraints. For example, search component 204 may be configured to search across one or more databases to identify all additional dataset entries that contain a second constraint in at least one entry field of the multiple entry fields for each dataset entry. Search component 204 may be configured to identify all dataset entries that contain either constraint 302 or constraint 304.

In various implementations, search component 204 may be configured to limit a search to selected databases and/or selected datasets. For example, search component 204 may be configured to limit a search to one or more databases and/or one or more datasets identified by a user. In some implementations, search component 204 may be configured to limit a search to one or more databases. For example, search component 204 may be configured to limit a search to one or more datasets and/or databases identified by a user and/or one or more datasets and/or databases to which a user conducting a search has been granted access by an administrator. In various implementations, search component 204 may be configured to search additional databases and/or additional datasets imported by import/export component 214.

Search component 204 may be configured to predict associations (i.e., a join) between identified dataset entries in one or more datasets and/or databases. For example, each dataset entry may correspond to a row in a dataset. In various implementations, search component be configured predict a join between individual rows in one or more datasets. A join may indicate that a first row in a first dataset is related to a second row in a second dataset. For example, a first dataset may relate to employees of a company (i.e., an employee directory). A row in the first dataset may relate to an employee named "John Smith." The first row may include values in one or more columns. Each column may correspond to a property defined by that dataset. For example, each column may correspond to a property such as office location, position, salary, and/or other attribute of an employee. A second dataset may relate to individuals who have signed up to receive newsletter (i.e., a mailing list). A row in the second dataset may also relate to "John Smith" and include values in one or more columns of the dataset. The columns in the second dataset may correspond to different properties than those included in the first dataset. Search component 204 may be configured to determine that the row (i.e., dataset entry) in the first dataset corresponding to "John Smith" relates to the row in the second dataset corresponding to "John Smith." For example, search component 204 may be configured to determine that the row in the first dataset and the row in the second dataset are associated, share similar properties, describe the same subject, and/or are otherwise related. In various implementations, search component may be configured to predict joins between datasets once one or more dataset entries are identified based on one or more constraints. As such, the system may be able to suggest additional data (i.e., properties) to provide for an identified dataset entry based on a predicted association with a dataset entry in a different dataset.

Search component 204 may be configured to predict that a first row in a first dataset is related to a second row in a second dataset. For example, search component 204 may be configured to predict one or more dataset entries from one or more different datasets and/or databases that are related to one or more dataset entries identified via a search conducted based on one or more constraints. In some implementations, the one or more related dataset entries may be identified based on shared values and/or field types (i.e., columns). Values and/or field types shared between dataset entries may indicate that one or more dataset entries are related. As an example, related dataset entries may correspond to the same person, place, item, event, and/or other object that is the subject of a dataset entry. In various implementations, search component 204 may be configured to search across the one or more datasets and/or databases to identify all dataset entries that may be associated with a dataset entry identified based on a constraint. In some implementations, search component 204 may be configured to predict the dataset entries that are related from among the identified dataset entries based on one or more prior searches conducted, one or more prior datasets created, and/or other user activity and/or feedback. In various implementations, related dataset entries and/or the dataset and/or database containing the related dataset entries may be presented to the user. For example, one or more values from a related dataset entry may be automatically populated in association with the identified dataset entry to which it relates. In some implementations, recommendation component 210 may be configured to recommend related dataset entries and/or the dataset and/or database containing the related dataset entries to the user. Upon receiving a selection indicating an intention to display the values from one or more related dataset entries, the related dataset entries themselves, and/or the dataset and/or database containing the related dataset entries within the results, the values from one or more related dataset entries, the related dataset entries themselves, and/or the dataset and/or database containing the related dataset entries may be displayed within the results.

Returning to FIG. 2, results component 206 may be configured to narrow the dataset entries identified by search component 204 based on the one or more received constraints and determine an appropriate arrangement of the identified dataset entries to be provided to the user. In various implementations, results component 206 may identify an entry field of a dataset entry that contains a constraint based on the one or more identified dataset entries containing one or more constraints. In various implementations, results component 206 may compare the identified entry fields and determine the appropriate entry fields to provide to a user.

For example, and referring to FIG. 3A, results component 206 may be configured to determine that, in the majority of identified dataset entries, or other threshold amount of identified dataset entries, constraint 302 appears in an entry field associated with "First Name." As such, results component 206 may be configured to determine that the column associated with the constraint should be associated with First Name and that the appropriate arrangement of the identified dataset entries should comprise First Name and Last Name in close proximity based on an identified association between First Name and Last Name and/or a determination that First Name appears in close proximity to Last Name in a majority of datasets from which the dataset entries containing the constraint are identified.

Results component 206 may be configured to update a visual representation of identified dataset entries by determining how one or more dataset entries should appear based on values within one or more columns of the one or more dataset entries, the entry field type of one or more columns of the one or more dataset entries, the placement of a constraint within a row or column, and/or other aspects of the one or more dataset entries. In this manner, results component 206 may be configured to collapse one or more rows (or dataset entries) together based on shared properties of the one or more rows.

For example, and returning to FIG. 2, results component 206 may be configured to update a visual representation of identified dataset entries based on additional constraints provided by a user. For example, and referring to FIG. 3A, the identified dataset entries are provided with the first four dataset fields comprising, "First Name," "Last Name," "Email Address," and "User ID." If an additional constraint is received, results component 206 may modify the visual representation based on the constraint. For example, and referring to FIG. 3B, constraint 308 comprising "London, UK" is received. Upon receiving constraint 308, search component 204 may be configured to search across one or more databases to identify all dataset entries that contain constraint 308 (i.e., London, UK). For example, search component 204 may identify at least a third dataset entry from one or more databases for "Jane Doe" who is located in "London, UK" and who has a user ID of "3546." In response to receiving constraint 308, results component 308 may be configured to modify the visual representation of the first dataset entry and the second dataset entry based on constraint 308.

In various implementations, results component 206 may be configured to determine an appropriate arrangement of the identified dataset entries to be provided to the user based on one or more constraints based on the type of the entry field in which the one or more constraints are found. For example, results component 206 may score the results of a constraint search based on the number of entries in which a constraint is found in each possible field type. For example, field types may include first name, a last name, a user identification, contact information, location, position, and/or other types of fields of the one or more datasets to be searched.

For example, and referring to FIG. 3B, if "London, UK" is found in "Office Location" or "Location" in nine dataset entries and "Name" in two dataset entries, results component 206 may determine that the appropriate arrangement of the dataset entries would comprise the column corresponding with the constraint to be "Office Location" or "Location" as opposed to "Name." As such, results component 206 may assign scores to one or more identified entry fields to determine the entry field that best suits the results identified based on the constraints provided by the user.

Display component 208 may be configured to generate a visual representation of the results of a constraint search containing the dataset entries identified by search component 204 based on the appropriate arrangement of the identified dataset entries determined by results component 206. In some embodiments, the visual representation may be provided to the user via an interface presented to the user through a respective display screen of the computing device 112 and/or the system 102. For example, display component 208 may generate exemplary interface 300 depicted by FIGS. 3A-B. In some embodiments, the interfaces may be provided by a software application running on the computing device 112 and/or the system 102.

Display component 208 may be configured to generate a visual representation of one or more dataset entries identified by search component 204. In some implementations, display component 208 may be configured to generate a visual representation of only one dataset entry identified by search component 204 per constraint searched. In some implementations, display component 208 may be configured to generate a visual representation of every dataset entry identified by search component 204 for each constraint searched. In some implementations, display component 208 may be configured to generate a visual representation of less than all of the dataset entries identified by search component 204 and provide a visual depiction of the full number of dataset entries identified per constraint searched. For example, and referring to FIG. 3A, display component 208 may be configured to generate a visual representation comprising the dataset entry for "John Doe" in association with constraint 302 and the dataset entry for "John Smith" in association with constraint 304. Display component 208 may be configured to provide visual indicators 306, which comprise a visual depiction of the full number of dataset entries identified for the search associated with constraint 302 and the full number of dataset entries identified for the search associated with constraint 304. For example, and referring to FIG. 3B, display component 208 may be configured to generate a visual representation comprising the dataset entry for "John Doe" in association with constraint 302, the dataset entry for "John Smith" in association with constraint 304, and the dataset entry for "Jane Doe" in association with constraint 306. Display component 208 may be configured to provide visual indicators 310, which comprise a visual depiction of the full number of dataset entries identified for the search associated with constraint 302, the full number of dataset entries identified for the search associated with constraint 304, and the full number of dataset entries identified for the search associated with constraint 306.

Recommendation component 210 may be configured to recommend one or more constraints for a search, one or more databases in which to search, and/or one or more datasets in which to search and/or add to a visual representation of results of a constraint search. In various implementations, recommendation component 210 may be configured to recommend one or more constraints, one or more databases, and/or one or more datasets based on previously entered constraints, results (e.g., identified dataset entries) from concurrently or previously performed searches, datasets cached by caching component 212, and/or other information available to constraint drive database search engine 202. In some implementations, recommendation component 210 may be configured to dynamically recommend one or more constraints, one or more databases, and/or one or more datasets as a user enters text via computing device 110. For example, one or more recommended constraints, one or more recommended databases, and/or one or more recommended datasets may appear below a text input as a user enters text via computing device 110. In various implementations, recommendation component 210 may be configured to cause recommended constraints, databases, and/or datasets to be provided to the user via an interface by display component 208. When one or more recommended constraints, databases, and/or datasets are selected by a user via computing device 110, the recommended one or more constraints, databases, and/or datasets may be included in the search of the one or more databases and/or one or more datasets by search component 204 and/or included in the visual representation of the results of a constraint search by display component 208.

Caching component 212 may be configured to cache identified dataset entries. For example, caching component 212 may be configured to cache identified dataset entries based on the constraints based on which they were identified. For example, caching component 212 may cache the results of a search based on the constraint "John." If "John" is later used as a constraint in the search of the same or similar databases, caching component 212 may provide the identified dataset entries and/or an indication that the results are stored and accessible to results component 206. The cached results of previous constraint driven database searches may be used to reduce processing time when performing searches in one or more databases and/or one or more datasets.

Import/export component 214 may be configured to import one or more databases and/or one or more datasets of one or more databases into a search and/or incorporate one or more databases and/or one or more datasets into a visual representation of the results of a constraint search. Import/export component 214 may be configured to receive an identification of one or more databases or one or more datasets from a user. Import/export component 214 may be configured to provide instructions to search component 204 to include the identified one or more databases and/or the one or more datasets in the one or more databases comprising one or more datasets to be searched by search component 204 based on constraints provided by the user.

Import/export component 214 may be configured to export the results of a constraint search. In various implementations, import/export component 214 may be configured to export results of a constraint search in response to a user selection indicating an intent to export and/or share results of a constraint search. For example, import/export component 214 may be configured to generate a new dataset, for later retrieval and/or access, based on the results of the constraint search provided to the user and/or an abstract representation of the constraint search performed. An abstract representation of the constraint search performed may identify the constraints upon which the constraint search is based and/or the one or more databases/datasets included in the constraint search.

Import/export component 214 may be configured to export the results of a constraint search as both a dynamic dataset and a static dataset. In various implementations, import/export component 214 may be configured to export the results of a constraint search as a dynamic dataset. For example, import/export component 214 may be configured to export the results of a constraint search as a dynamic dataset that updates continuously, periodically, or upon access based on the constraints upon which the constraint search is based and/or the one or more databases and one or more datasets included in the constraint search and the results of the constraint search. In various implementations, import/export component 214 may be configured to export the results of a constraint search as a static dataset. For example, import/export component 214 may be configured to export the results of a constraint search as a static dataset containing the results of the constraint search as provided to the user.

Exemplary Flowchart of Process

Figure 4:
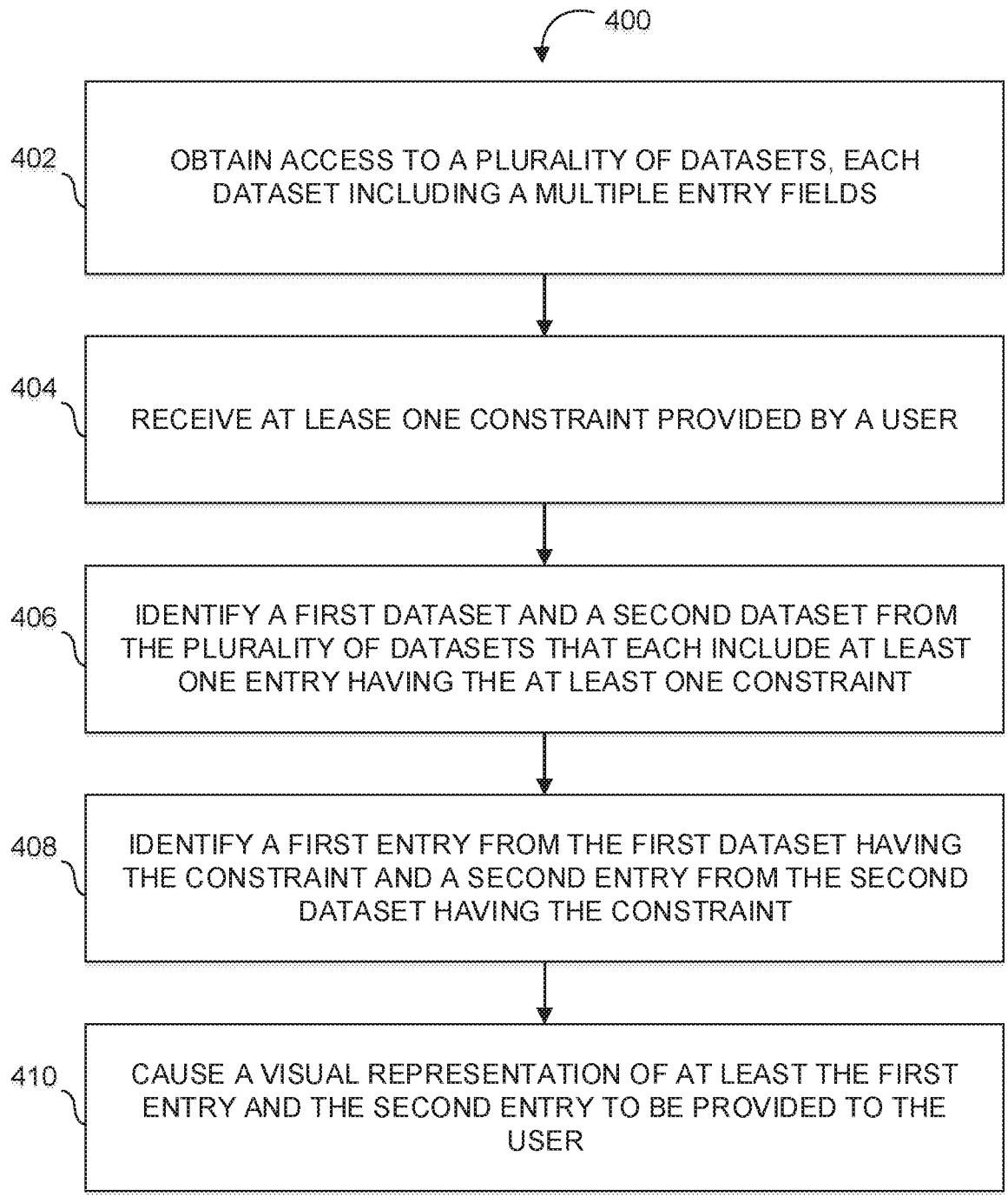
FIG. 4 depicts a flowchart of an example method for performing constraint driven database searching, in accordance with various embodiments.

FIG. 4 depicts a flowchart 400 of an example method for performing constraint driven database searching, in accordance with various embodiments. The operations of method 400 presented below are intended to be illustrative and, as such, should not be viewed as limiting. In some implementations, method 400 may be accomplished with one or more additional operations not described, and/or without one or more of the operations discussed. In some implementations, two or more of the operations may occur substantially simultaneously. The described operations may be accomplished using some or all of the system components described herein.

In an operation 402, method 400 may include obtaining access to a plurality of databases and/or a plurality of datasets of one or more databases. In various implementations, each entry within the plurality of databases and/or the plurality of datasets of one or more databases include multiple entry fields per entry.

In an operation 404, method 400 may include receiving at least one constraint provided by a user. Constraints may comprise a text string of one or more letters, numbers, words, and/or other textual input.

In an operation 406, method 400 may include identifying at least a first dataset and a second dataset from the plurality of datasets, wherein the identified first dataset and the identified second dataset each include at least one dataset entry having the at least one constraint term in one of multiple entry fields. In an operation 408, method 400 may include identifying the at least one dataset entry within the first dataset and the second dataset (i.e., a first entry and a second entry) having the at least one constraint term in one of multiple entry fields. In some implementations, operation 406 and operation 408 may be performed by a processor component the same as or similar to search component 204 (shown in FIG. 2 and described herein).

In an operation 410, method 400 may include causing a visual representation of at least the first entry and the second entry to be provided to the user. In some implementations, operation 410 may be performed by a processor component the same as or similar to display component 208 (shown in FIG. 2 and described herein).

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
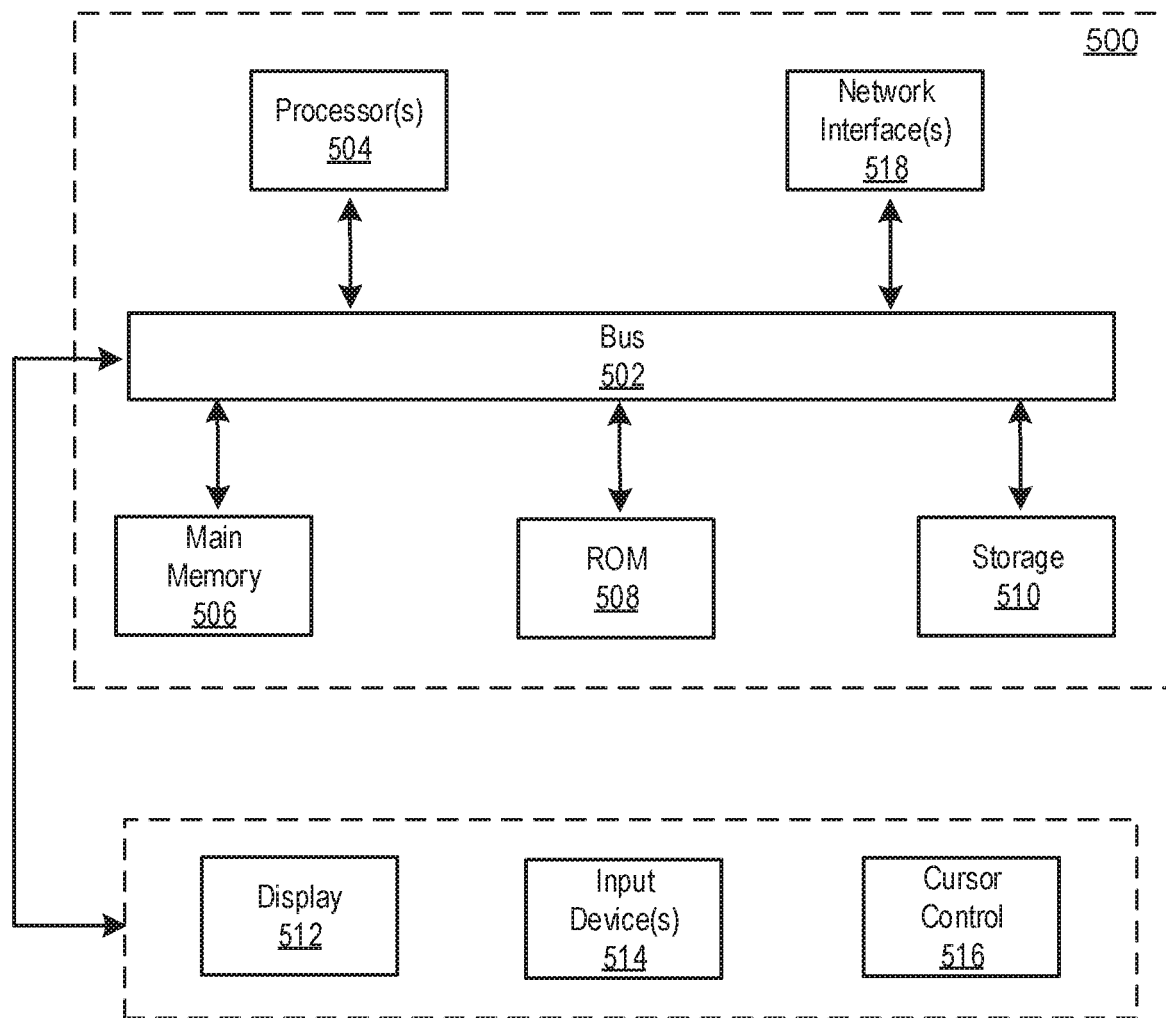
FIG. 5 depicts a block diagram of an example computer system in which any of the embodiments described herein may be implemented.

FIG. 5 depicts a block diagram of an example computer system 500 in which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system comprising:
   one or more processors; and
   memory storing instructions that, when executed by the one or more processors, cause the system to perform:
   receiving at least one constraint term inputted into a cell of a table presented in a graphical user interface;
   identifying, in response to receiving the at least one constraint term, at least one first dataset, the at least one first dataset including at least one first dataset entry having the at least one constraint term in a first set of first entry fields;
   predicting the at least one first dataset entry of the at least one first dataset is related to at least one second dataset entry of at least one second dataset, the at least one second dataset entry having a second set of second entry fields, the predicting being based on at least one of the first entry fields and at least one of the second entry fields corresponding to each other;
   updating one or more visual representations of the table based on the at least one first dataset entry of the at least one first dataset and the at least one second dataset entry of the at least one second dataset; and
   causing the graphical user interface to present the at least one first dataset entry of the at least one first dataset and the at least one second dataset entry of the at least one second dataset in corresponding rows of the table based on the updated one or more visual representations.

2. The system of claim 1, wherein the at least one constraint term includes at least a first constraint term and a second constraint term, and wherein the system is further caused to perform:
   identifying a first plurality of dataset entries of the first dataset having the first constraint term in at least a first entry field of the first set of first entry fields;
   caching the first plurality of dataset entries in a local memory module;
   identifying, from the cached first plurality of dataset entries, a second plurality of dataset entries having the second constraint term in at least a second entry field of the first set of first entry fields; and
   causing a visual representation of the second plurality of dataset entries to be provided as the at least one first dataset entry.

3. The system of claim 2, wherein the system is further caused to perform:
   receiving a third constraint term;
   identifying at least a third dataset entry including the third constraint term in a third set of entry fields;
   updating the visual representation of the at least one first dataset entry based on the third constraint term; and
   causing a second visual representation of at least the third dataset entry to be provided to the user.

4. The system of claim 1, wherein the system is further caused to perform:
   identifying a first entry field of the first set of first entry fields having the at least one constraint term;
   identifying a second entry field of the second set of second entry fields; and
   comparing the first entry field to the second entry field, wherein the visual representation of the at least one first dataset entry and the at least one second dataset entry is based on at least the comparison of the first entry field to the second entry field.

5. The system of claim 4, wherein the at least one first dataset entry and the at least one second dataset entry each comprise a plurality of entries, and wherein the comparing the first entry field to the second entry field causes the system to perform:
   determining a first type of entry field of the first entry field;
   determining a second type of entry field of the second entry field;
   assigning a first value to the first type of entry field based on a first number of the plurality of entries in which the at least one constraint term is identified within the first type of entry field;

assigning a second value to the second type of entry field based on a second number of the plurality of entries in which the at least one constraint term is identified within the second type of entry field; and comparing the first value to the second value, wherein the visual representation of the at least one first dataset entry and the at least one second dataset entry is based on at least the comparison of the first value to the second value.

6. The system of claim 3, wherein the updating the visual representation of the at least one first dataset entry based on the third constraint term causes the system to perform:

identifying a third entry field of the third set of entry fields having the third constraint term;

determining a third type of entry field of the third entry field; and updating the visual representation of the at least one first dataset entry based on the third type of entry field of the third entry field.

7. The system of claim 1, wherein a first type of entry field of a first entry field and a second type of entry field of a second entry field comprise one of a first name, a last name, a user identification, contact information, location, and/or position.

8. The system of claim 1, wherein the system is further caused to perform:

determining that a stored dataset is associated with the at least one constraint term and the second dataset; and responsive to determining that the stored dataset is associated with the at least one constraint term and the second dataset, identify the at least one second dataset entry including the at least one constraint term from the stored dataset.

9. The system of claim 1, wherein the system is further caused to perform:

receiving an identification of a dataset to be searched; and causing the identified dataset to be added to the plurality of datasets.

10. The system of claim 1, wherein the system is further caused to perform:

generating a new dataset comprising at least the first dataset entry including the at least one constraint term and the second dataset entry including the at least one constraint term, wherein the new dataset is stored in a repository for available for later retrieval.

11. A computer-implemented method implemented by a computer system having one or more physical processors and storage media storing machine-readable instructions that, when executed by the one or more physical processors, cause the computer system to perform the method, the method comprising:

receiving at least one constraint term inputted into a cell of a table presented in a graphical user interface;

identifying, in response to receiving the at least one constraint term, at least one first dataset, the at least one first dataset including at least one first dataset entry having the at least one constraint term in a first set of first entry fields;

predicting the at least one first dataset entry of the at least one first dataset is related to at least one second dataset entry of at least one second dataset, the at least one second dataset entry having a second set of second entry fields, the predicting being based on at least one of the first entry fields and at least one of the second entry fields corresponding to each other;

updating one or more visual representations of the table based on the at least one first dataset entry of the at least one first dataset and the at least one second dataset entry of the at least one second dataset; and causing the graphical user interface to present the at least one first dataset entry of the at least one first dataset and the at least one second dataset entry of the at least one second dataset in corresponding rows of the table based on the updated one or more visual representations.

12. The method of claim 11, wherein the at least one constraint term includes at least a first constraint term and a second constraint term, and further comprising:

identifying a first plurality of dataset entries of the first dataset having the first constraint term in at least a first entry field of the first set of first entry fields;

caching the first plurality of dataset entries in a local memory module;

identifying, from the cached first plurality of dataset entries, a second plurality of dataset entries having the second constraint term in at least a second entry field of the first set of first entry fields; and causing a visual representation of the second plurality of dataset entries to be provided as the at least one first dataset entry.

13. The method of claim 12, further comprising:

receiving a third constraint term;

identifying at least a third dataset entry including the third constraint term in a third set of entry fields;

updating the visual representation of the at least one first dataset entry based on the third constraint term; and causing a second visual representation of at least the third dataset entry to be provided to the user.

14. The method of claim 11, further comprising:

identifying a first entry field of the first set of first entry fields having the at least one constraint term;

identifying a second entry field of the second set of second entry fields; and comparing the first entry field to the second entry field, wherein the visual representation of the at least one first dataset entry and the at least one second dataset entry is based on at least the comparison of the first entry field to the second entry field.

15. The method of claim 14, wherein the at least one first dataset entry and the at least one second dataset entry each comprise a plurality of entries, and wherein the comparing the first entry field to the second entry field comprises:

determining a first type of entry field of the first entry field;

determining a second type of entry field of the second entry field;

assigning a first value to the first type of entry field based on a first number of the plurality of entries in which the at least one constraint term is identified within the first type of entry field;

assigning a second value to the second type of entry field based on a second number of the plurality of entries in which the at least one constraint term is identified within the second type of entry field; and comparing the first value to the second value, wherein the visual representation of the at least one first dataset entry and the at least one second dataset entry is based on at least the comparison of the first value to the second value.

16. The method of claim 13, wherein the updating the visual representation of the at least one first dataset entry based on the third constraint term comprises:

identifying a third entry field of the third set of entry fields having the third constraint term;

determining a third type of entry field of the third entry field; and updating the visual representation of the at least one first dataset entry based on the third type of entry field of the third entry field.

17. The method of claim 11, further comprising:

determining that a stored dataset is associated with the at least one constraint term and the second dataset; and responsive to determining that the stored dataset is associated with the at least one constraint term and the second dataset, identify the at least one second dataset entry including the at least one constraint term from the stored dataset.

18. The method of claim 11, further comprising:

receiving an identification of a dataset to be searched; and causing the identified dataset to be added to the plurality of datasets.

19. The method of claim 11, further comprising:

generating a new dataset comprising at least the first dataset entry including the at least one constraint term and the second dataset entry including the at least one constraint term, wherein the new dataset is stored in a repository for available for later retrieval.

20. A non-transitory computer readable medium comprising instructions that, when executed, cause one or more processors to perform:

receiving at least one constraint term inputted into a cell of a table presented in a graphical user interface;

identifying, in response to receiving the at least one constraint term, at least one first dataset, the at least one first dataset including at least one first dataset entry having the at least one constraint term in a first set of first entry fields;

predicting the at least one first dataset entry of the at least one first dataset is related to at least one second dataset entry of at least one second dataset, the at least one second dataset entry having a second set of second entry fields, the predicting being based on at least one of the first entry fields and at least one of the second entry fields corresponding to each other;

updating one or more visual representations of the table based on the at least one first dataset entry of the at least one first dataset and the at least one second dataset entry of the at least one second dataset; and causing the graphical user interface to present the at least one first dataset entry of the at least one first dataset and the at least one second dataset entry of the at least one second dataset in corresponding rows of the table based on the updated one or more visual representations.

* * * * *